United States Patent Office 3,798,260
Patented Mar. 19, 1974

3,798,260
PROCESS FOR PRODUCING ACYLOXY-
DODECATRIENES
Saburo Hattri, Tokyo, and Naoshi Imaki, Kawasaki,
Japan, assignors to Mitsubishi Chemical Industries, Ltd.,
Tokyo, Japan
No Drawing. Filed Dec. 13, 1971, Ser. No. 207,649
Claims priority, application Japan, Dec. 30, 1970,
46/125,874; Mar. 29, 1971, 46/18,561
The portion of the term of the patent subsequent to
Jan. 29, 1990, has been disclaimed
Int. Cl. C07c 67/04
U.S. Cl. 260—497 A
8 Claims

ABSTRACT OF THE DISCLOSURE

Acyloxydodecatriene is produced by reacting an octatriene, butadiene, and a carboxylic acid in the presence of a catalytic amount of palladium or a palladium compound, and an amine.

RELATED APPLICATIONS

This application is related in subject matter to copending U.S. patent application Ser. No. 212,748, filed Dec. 27, 1971 of the same title and by the same inventors.

BACKGROUND OF THE INVENTION

Field of the invention

This invention relates generally to a process for producing acyloxydodecatrienes. More particularly, this invention relates to a process for producing acyloxydodecatrienes by the use of octatriene, butadiene and a carboxylic acid as the reactants.

In this specification, the term "butadiene" is intended to include both 1,3-butadiene and the lower alkyl substituted 1,3-butadienes, and the term "octatriene" is intended to include both 1,3,7-octatriene and the lower alkyl substituted 1,3,7-octatrienes, which are substituted on the 2-8 carbon atom positions.

Description of the prior art

Acyloxydodecatrienes are well known triene derivatives which have found important industrial utilization in a variety of fields. In studying the oligomerization reactions of butadiene, it had been found that the reaction of butadiene, carboxylic acid and octatriene can be quite effectively catalyzed by the use of certain palladium compounds. Those compounds, however, were not completely satisfactory in terms of catalytic activity and in terms of the extent of side reactions. A more effective catalytic system for the production of this useful product has therefore been sought.

SUMMARY OF THE INVENTION

Accordingly, it is one object of this invention to provide a process for producing useful acyloxydodecatrienes in an industrially effective manner.

This and other objects of this invention, as will hereinafter become more readily apparent, can be attained by reacting an octatriene, a butadiene, and a carboxylic acid in the presence of a catalytic amount of the combination of palladium or a palladium compound, and an amine.

DETAILED DESCRIPTION OF PREFERRED EMBODIMENTS

The octatriene used as a reactant herein may be 1,3,7-octatriene or a lower alkyl substituted 1,3,7-octatriene having lower alkyl groups at the 2–8 positions and preferably at the 2–7 position. It is especially preferable to use an octatriene having the formula:

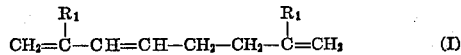

wherein each $R_1$ may be the same or different, and each may represent hydrogenn or an alkyl group. Suitable examples of said Formula I include 1,3,7-octatriene, 2,7-dimethyl-1,3,7-octatriene, etc.

The carboxylic acids used as reactants in this process are those compounds having the formula:

$$R_2CO_2H \qquad (II)$$

wherein $R_2$ represents an alkyl group, cycloalkyl group, aryl group or aralkyl group and which contains 2–20 carbon atoms. Suitable examples of compounds having the Formula II include the aliphatic carboxylic acids, e.g., acetic acid, propionic acid, lactic acid, iso-lactic acid, pivalic acid; alicyclic carboxylic acids, e.g., cylohexyl carboxylic acid; and aromatic carboxylic acid, e.g., benzoic acid. It is most preferable to use a lower aliphatic carboxylic acid, e.g., acetic acid and propionic acid, and especially acetic acid.

The reaction of this invention can be shown by the following schematic, when the compound having the Formula I is used as the octatriene.

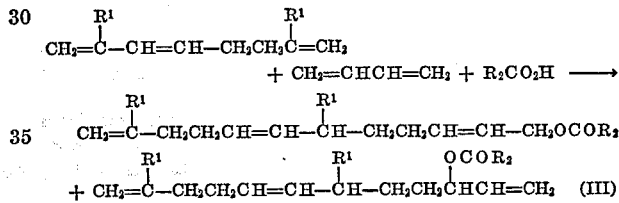

In the reaction of this invention, acyloxyoctadienes having the following Formulae IV, V and VI are produced as byproducts:

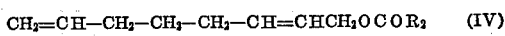  (IV)

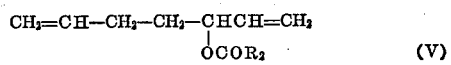  (V)

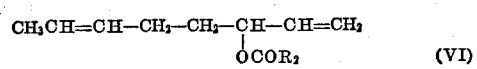  (VI)

The catalyst system used for the process of this invention comprises palladium, or a palladium compound, and an amine. As stated above, the reaction of this invention (the reaction shown in Formula III) can be carried out by use of certain known palladium compounds. However, the catalytic stability and activity of those catalysts has now been found to be quite remarkably increased by the addition of an amine to the reaction system.

The palladium compound of this invention may be either metallic palladium or a palladium compound. If it is metallic palladium, it may be carried on a suitable support such as Pd-C (palladium carried on carbon powder) or Pd-Al$_2$O$_3$ (palladium carried on alumina).

Suitable palladium compounds which may be used include the organic acid salts of palladium, e.g., palladium acetate, palladium propionate, palladium benzoate, and preferably those containing 2–20 carbon atoms in the said moiety; inorganic acid salts of palladium, e.g., palladium chloride, palladium bromide, palladium nitrate; chelate complexes of palladium, e.g., palladium acetylacetonate, palladium acetoacetyl ester; π-allyl type complexes of palladium, e.g., π-allyl palladium acetate, π-methallyl palladium acetate; palladium phosphine complexes, e.g. bis(triphenylphosphine) palladium diacetate; tetrakis (triphenylphosphine) palladium, bis(triphenylphosphine) palladium-maleic anhydride complex; bis(triphenylphosphine) palladium-benzoequinone complex; and palladium-nitrile complexes, e.g., bis(benzonitrile) palladium dichloride.

Mixed catalysts of the palladium compound with a phosphine, phosphite, nitrile or isonitrile, etc., may also be used. Typical examples of said phosphines, phosphites, nitriles and isonitriles include: the phosphines having the general formula: $PR'_3$, wherein $R'$ represents an alkyl, cycloalkyl, aryl or aralkyl group, triethylphosphine, tricyclohexylphosphine, triphenylphosphine tritolylphosphine; the phosphites having the general formula: $P(OR')$, wherein $R'$ is defined as above, such as triethylphosphite, triphenylphosphite and tritolylphosphite; the nitriles such as the aliphatic nitriles, such as acetonitrile, aromatic nitriles such as phthalonitrile; the isonitriles having the general formula: $R'NC$, wherein $R'$ is as defined above.

It is especially preferable to use a palladium compound having an organic ligand, such as organic acid salts of palladium, chelate complexes of palladium, π-allyl type complexes of palladium, palladium-phosphine complexes, or metallic palladium. The ligand of said complex is preferably an organic ligand.

The amines used for the reaction include the aliphatic amines e.g., methylamine, dimethylamine, trimethylamine, ethylamine, diethylamine, triethylamine, propylamine, dipropylamine, tripropylamine, isopropylamine, diisopropylamine, butylamine, dibutylamine, t-butylamine, octylamine, dioctylamine, trioctylamine, ethanolamine, diethanolamine, ethylenediamine, diethylenetriamine, and preferably those containing from 1-30 carbon atoms; the saturated heterocyclic amines, e.g., morpholine, pyrrolidine, piperidine and preferably those containing from 1-30 carbon atoms; homocyclicaromatic amines, e.g., aniline, toluidine; and heterocyclic aromatic amines, e.g., pyridine, quinoline.

It is possible to use anion exchange resins having a tertiary amine as the ion exchange group.

It is especially effective to use an aliphatic amine. While it is not altogether understood why the amine enhances the catalytic activity, it is believed that stability of the palladium compound, as main catalytic component, is increased by the effect of the amine so that the reaction of this invention can be carried out at higher temperatures as compared with the use of the palladium compound alone, thus resulting in a higher degree of catalytic activity. The effect of said amine, however, is not restricted to increasing the stabilization of the palladium compound. For instance, a palladium halide has no catalytic activity in the subject reaction when used alone. However, it shows significant catalytic activity when used in combination with an amine.

When the catalyst mixture contains both a palladium compound and a phosphine, the quantity of acyloxyoctadiene byproducts produced is increased, and the selectivity of the reaction for acyloxydodecatriene is decreased. However, when an amine is added to the catalytic system, the selectivity for acyloxydodecatriene is quite surprisingly increased. It is considered that this fact is indicative of unexpected and synergistic results which can only be attributable to the use of the amine.

The usable quantitative ratios of the octatriene, the butadiene and the carboxylic acid can be selected over wide ranges. However, the selectivity of the reaction for acyloxydodecatrienes or acyloxyoctadienes will vary depending upon the quantitative ratio of the three reactants. In order to maximize the yield of acyloxydodecatrienes, it is preferable to use a molar ratio of the three reactants of 1.0:0.1–10:0.1–2.0 and preferably 1.0:0.5–2.0:0.5–1.0 of octatriene:butadiene:carboxylic acid. When the molar ratio of butadiene is high, the reaction will be selective toward acyloxyoctadiene.

The palladium or palladium compound may be used in the amount of 0.0001–0.1 gram atom preferably, 0.001–0.01 gram atom, as palladium atom, per 1 mole of octatriene. The amount of amine is not specifically limited, but it is usually added in the range of about 1–100 mole per 1 gram atom of palladium atom. It is also possible to use relatively large amounts of amine in the catalyst, particularly tertiary amines, e.g., in more than equimolar amounts, based on the moles of carboxylic acid.

The reaction can be effected without a solvent medium. However, it is possible to use an inert medium. Typical mediums include the aromatic compounds, e.g., benzene, toluene; ethers, e.g., diethylether, tetrahydrofuran, dioxane; esters, e.g., ethyl acetate; ketones, e.g., acetone.

The reaction temperature may be 10°–200° C., preferably 60°–150° C. The reaction velocity is low at lower temperatures, while byproducts of 4-vinylcyclohexene and dodecatetraene, etc. are produced, and the catalytic activity is decreased at higher temperatures. The reaction pressure may be 1–10 atm., and preferably 5–25 atm., and the reaction can be carried out under the pressure of an inert gas, e.g., nitrogen or argon.

The reaction mixture may include acyloxydodecatriene, acyloxyoctadiene, unreacted raw materials, medium and catalyst. Following the reaction, the reaction products may be separated and the unreacted reactants recovered by distillation.

An equilibrium relationship exists between the 1-acyloxydodecatriene and the 3-acyloxydodecatriene in the reaction system. Accordingly, when one type of isomer is supplied to the reaction system, the formation of the same type of isomer will be decreased and the formation of the other type of isomer will be increased. It is therefore desirable to add a 3-acyloxydodecatriene when the formation of a 1-acyloxydodecatriene is desired, and to add a 1-acyloxydodecatriene when the opposite result is desired. The amount of such isomer which may be added to the reaction is not limited and can be more or less than the equilibrium amount at the particular reaction condition. When the amount of one isomer added to the reaction system is greater than the equilibrium amount, the formation of the same type of the adduct will be decreased, and simultaneously a portion of the isomer added will be isomerized to the opposite type of isomer until equilibrium is reached between the two isomers at the reaction conditions. The desired isomer can therefore be selectively and simply produced in an industrially advantageous manner.

The acyloxydodecatrienes prepared by the process of this invention may be the esters of long chain unsaturated alcohols having a straight chain structure, as stated above, which are useful for producing long chain unsaturated alcohols, long chain unsaturated carboxylic acids, synthetic drying oils and other useful derivatives.

In the process of this invention, an acyloxyoctadiene is produced as a reaction byproduct, but the acyloxyoctadienes can be easily separated from the acyloxydodecatrienes by distillation. Moreover, acyloxyoctadienes can be used as starting materials for the production of a variety of derivatives. Accordingly, the byproduction of acyloxyoctadienes will not cause any severe difficulty.

The main starting material for the process of this invention, the octatrienes, can be easily produced by dimerization of butadiene or isoprene. Accordingly, the process of this invention is quite advantageous from an industrial point of view.

The catalyst system used for the process of this invention is quite stable as compared with the use of palladium compound above, and it retains its high catalytic activity at high temperatures to a much higher degree so that the reaction can be carried out at relatively higher temperatures so that the reaction velocity can be increased, and the amount of expensive palladium compound can be decreased.

Having generally described the invention, a further understanding can be attained by reference to certain specific examples which are provided herein for purposes of illustration only and are not intended to be limiting in any manner unless otherwise specified.

The abbreviations used in the examples will have the following meanings:

ADT: acyloxydodecatrienes
1-ADT: 1-acyloxy-2,7,11-dodecatrienes
3-ADT: 3-acyloxy-1,7,11-dodecatrienes
AOD: acyloxyoctadienes
1-AOD: 1-acyloxy-2,7-octadienes
3-AOD: 3-acyloxy-1,7-octadienes
3'-AOD: 3-acyloxy-1,6-octadienes
D rate: molar percent of ADT to total amount of ADT and AOD in the resulting product
n rate: percent of 1-ADT or 1-AOD to ADT or AOD.

EXAMPLE 1

11 g. (0.1 mole) of 1,3,7-octatriene (purity 98.2%), 3 g. (0.05 mole) of acetic acid, 22 mg. (0.1 mmole) of palladium acetate, and 87 mg. 1 mmole) of morphorine were fed to a 100 ml. autoclave in an argon gas atmosphere. About 8.1 g. (0.15 mole) of 1,3-butadiene was further fed under pressure, and the contents were reacted at 110° C. for 5 hours, while shaking the autoclave. The pressure of the autoclave was decreased from 10.3 kg./cm.$^2$ G to 8.3 kg./cm.$^2$ G. After the reaction, the autoclave was cooled to room temperature, and the unreacted butadiene was recovered.

According to the analysis of the resulting products by gas chromatography, conversion of acetic acid was 74% and the resulting products were 1.35 g. of 1-acetoxy-2,7-octadiene (1-AOD), 0.63 g. of 3-acetoxy-1,7-octadiene (3-AOD) and 3-acetoxy-1,6-octadiene (3'-AOD), 3.85 g. of 1-acetoxy-2,7,11-dodecatriene (1-ADT) and 1.66 g. of 3-acetoxy-1,7,11-dodecatriene (3-ADT). Accordingly, the D rate was 68% and the n rate was 70%.

The 1-acetoxy - 2,7,11 - dodecatriene and 3-acetoxy-1,7,11-dodecatriene respectively have the following characteristics:

1-acetoxy-2,7,11-dodecatriene is a colorless liquid having a boiling point of 115-120° C./1 mm. Hg and the analytical results thereof are as follows:

(a) Elementary analysis.—Calculated for $C_{14}H_{22}O_2$ (percent): C, 75.63; H, 9.98. Analysis (percent): C, 75.36; H, 9.94.

(b) Infrared spectra: Absorption bands at 3060, 2960, 2910, 2850, 1735, 1670, 1638, 1415, 1360, 1240, 990, 970 and 910 cm.$^{-1}$.

(c) Nuclear magnetic resonance spectra: Absorption bands at 4.2-4.7 (multiple lines), 4.7-5.2 (multiple lines), 5.4-5.6 (double lines), 7.8-8.1 (multiple lines), 8.0 (single line) and 8.3-8.6 (multiple lines) $\tau$ value.

(d) Mass spectra: Peaks at 43 ($CH_3CO$), 61

$$(CH_3C(OH)_2),$$

and 162 ($C_{12}H_{18}$) of m/e value. Molecular weight is 222 ($CH_3COOC_{12}H_{19}$)

(e) Refractive index: $n_D^{21.5}=1.4649$.

3-acetoxy-1,7,11-dodecatriene is a colorless liquid having a boiling point of 95-100° C./1 mm. Hg and the analytical results thereof are as follows:

(a) Elementary analysis.—Calculated for $C_{14}H_{22}O_2$ (percent): C, 75.63; H, 9.98. Analysis (percent): C, 75.95; H, 10.04.

(b) Infrared spectra: Absorption bands at 3060, 2960, 2910, 2850, 1735, 1670, 1638, 1415, 1360, 1240, 990, 970, 910 cm.$^{-1}$.

(c) Nuclear magnetic resonance spectra: Absorption bands at 4.0-4.7 (multiple lines), 4.7-5.2 (multiple lines), 7.8-8.1 (multiple lines), 8.0 (single line) and 8.4-8.6 (multiple lines) of $\tau$ value.

(d) Mass spectra: Peaks at 43 ($CH_3CO$), 61

$$(CH_3C(OH)_2);$$

162 ($C_{12}H_{18}$) of m/e value. Molecular weight is 222 ($CH_3COOC_{12}H_{19}$).

(e) Refractive index $n_D^{21.5}=1.4638$.

(REFERENCE 1)

The reaction was repeated in accordance with the process of Example 1, except morphorine was not used. According to the analysis of the resulting products, conversion of acetic acid was 31% and the resulting products were 0.65 g. of 1-acetoxy-2,7-octadiene, 0.24 g. of 3-acetoxy-1,7-octadiene and 3-acetoxy-1,6-octadiene, 1.67 g. of 1-acetoxy-2,7,11-dodecatriene, and 0.64 g. of 3-acetoxy-1,7,11-dodecatriene. Accordingly, the D rate was 66% and the n rate of ADT was 72%.

(REFERENCE 2)

0.1 mole of 1,3,7-octatriene, 0.18 mole of 1,3-butadiene and 0.05 mole of acetic acid were reacted in the presence of catalyst of 0.5 mmole of $\pi$-allylpalladium chloride and 0.13 mmole of sodium phenolate wherein the conditions were the same as those of Example 1, at 110° C. for 5 hours.

The conversion of acetic acid was 10% and the resulting products were 0.35 g. of acetoxy octadienes and 0.67 g. of acetoxy dodecatriene.

EXAMPLE 2

The reaction was repeated in accordance with the process of Example 1, except using one of the below-indicated amines instead of morphorine. The type and amount of amine and the results were shown in Table I.

The anionic exchange resin A used in Experiments Nos. 2–10, is Amberlyst A–21; a styrene-divinylbenzene-tertiary amine type anionic exchange resin manufactured by Rhom & Hass Co., and the amount is shown by weight.

TABLE I

| | Amine | | Percent | | |
|---|---|---|---|---|---|
| Experiment | Type | Amount (mmole) | Conversion acetic acid | D rate | n Rate ADT |
| 2-1 | Triethylamine | 1 | 72 | 70 | 70 |
| 2-2 | Diisopropylamine | 1 | 57 | 68 | 71 |
| 2-3 | Butylamine | 1 | 76 | 66 | 70 |
| 2-4 | Tributylamine | 1 | 60 | 65 | 69 |
| 2-5 | t-Butylamine | 1 | 56 | 71 | 70 |
| 2-6 | Trioctylamine | 1 | 58 | 56 | 72 |
| 2-7 | Ethylenediamine | 0.2 | 73 | 57 | 71 |
| 2-8 | Aniline | 1 | 63 | 63 | 70 |
| 2-9 | Pyridine | 0.2 | 40 | 65 | 69 |
| 2-10 | Anion exchange resin A | [1] 2.6 | 45 | 66 | 71 |

[1] Grams.

EXAMPLE 3

The reaction was repeated in accordance with the process of Example 1, except that the amounts of 1,3,7-octatriene, 1,3-butadiene and acetic acid were changed, wherein 0.1 mmole of palladium acetate and 1 mmole of morphorine were used as catalysts and the reaction was conducted at 110° C. for 1 hour. The results are shown in Table II.

the amines stated in Table III. The results are stated in Table III.

TABLE III

| Experiment | Palladium compound | | Amine | | Percent | | |
|---|---|---|---|---|---|---|---|
| | Type | Mmole | Type | Mmole | Conversion acetic acid | D rate | n rate ADT |
| 6-1 | [π-C$_3$H$_5$)PdCl]$_2$ | 0.05 | (n-C$_4$H$_9$)$_3$N | 1 | 17 | 69 | 71 |
| 6-2 | (C$_6$H$_5$CN)$_2$PdCl$_2$ | 0.1 | (n-C$_4$H$_9$)$_3$N | 1 | 6 | 69 | 80 |

TABLE II

| Experiment | Mole | | | Percent | | |
|---|---|---|---|---|---|---|
| | Octatriene | Butadiene | Acetic acid | Conversion acetic acid | D rate | n rate ADT |
| 3-1 | 0.05 | 0.3 | 0.05 | 74 | 26 | 75 |
| 3-2 | 0.1 | 0.3 | 0.05 | 87 | 40 | 74 |
| 3-3 | 0.1 | 0.15 | 0.05 | 73 | 68 | 70 |
| 3-4 | 0.15 | 0.15 | 0.05 | 69 | 73 | 73 |
| 3-5 | 0.2 | 0.15 | 0.05 | 69 | 80 | 73 |

The results of Example 3 show that the production rate of acyloxydodecatriene to acyloxyoctadiene can be significantly varied by varying the molar ratio of the starting materials.

EXAMPLE 4

22 g. of 1,3,7-octatriene, 10.8 g. of 1,3-butadiene and 6.0 g. of acetic acid were reacted at 80° C. for 6 hours in the presence of a catalyst of 66 mg. of palladium acetate, and 261 mg. of morphorine.

The reaction was repeated in accordance with the process of Example 6, except without the use of amine. Substantially no acetoxydodecatrienes were found to be formed.

EXAMPLE 7

11 g. of 1,3,7-octatriene, 8 g. of 1,3-butadiene and 3 g. of acetic acid were reacted at the reaction temperature stated in Table IV for 5 hours, in the presence of a catalyst of the palladium compound and amine stated in Table IV.

TABLE IV

| Experiment | Palladium | | Amine | | Temp. (°C.) | Percent | | |
|---|---|---|---|---|---|---|---|---|
| | Type | Mmole | Type | Mmole | | Conversion acetic acid | D rate | n rate ADT |
| 7-1 | 5% Pd-C | 0.2 | | 0 | 110 | 4 | 66 | 84 |
| 7-2 | 5% Pd-C | 0.2 | Morphorine | 3 | 110 | 55 | 69 | 69 |
| 7-3 | 5% Pd-C | 0.5 | do | 2.5 | 90 | 52 | 61 | 69 |
| 7-4 | 5% Pd-C | 1.0 | do | 1 | 80 | 66 | 50 | 72 |
| 7-5 | 5% Pd-C | 0.5 | Butyl amine | 2.5 | 90 | 51 | 61 | 73 |

According to the analysis of the resulting products, conversion of acetic acid was 46%, and the resulting products were 2.52 g. of 1-acetoxy-2,7-octadiene, 0.48 g. of 3-acetoxy-1,7-octadiene and 3-acetoxy-1,6-octadiene, 4.94 g. of 1-acetoxy-2,7,11-dodecatriene, and 1.91 g. of 3-acetoxy-1,7,11-dodecatriene.

EXAMPLE 8

11 g. of 1,3,7-octatriene, 8 g. of butadiene and a specific amount of acetic acid were reacted at 110° C. for 5 hours in the presence of palladium acetate as palladium compound of catalyst and amine and phosphite compound stated in Table V.

TABLE V

| Experiment | Pd(oAc)$_2$ (mg.) | Amine | | Phosphite | | Acetic acid (g.) | Percent | | |
|---|---|---|---|---|---|---|---|---|---|
| | | Type | Mmole | Type | Mmole | | Conversion acetic acid | D rate | n rate ADT |
| 8-1 | 33 | (i-C$_3$H$_7$)$_2$NH | 0.1 | P(C$_6$H$_5$)$_3$ | 0.4 | 3 | 44 | 70 | 69 |
| 8-2 | 33 | (i-C$_3$H$_7$)$_2$NH | 1.0 | P(C$_6$H$_5$)$_3$ | 0.4 | 3 | 58 | 66 | 69 |
| 8-3 | 22 | | | P(OTL)$_3$ | 1.0 | 3 | 36 | 47 | 70 |
| 8-4 | 22 | O(CH$_2$CH$_2$)$_2$NH | 0.1 | P(OTL)$_3$ | 1.0 | 3 | 56 | 62 | 72 |
| 8-5 | 22 | | | P(OTL)$_3$ | 1.0 | 6 | 36 | 59 | 68 |
| 8-6 | 22 | (n-C$_4$H$_9$)$_3$N | 1.0 | P(OTL)$_3$ | 1.0 | 6 | 46 | 57 | 69 |
| 8-7 | 22 | (C$_2$H$_5$)$_3$N | 50 | P(OC$_6$H$_5$)$_3$ | 1.0 | 6 | 32 | 67 | 67 |

NOTE.—Pd(OAc)$_2$=palladium acetate; Pd(OTL)$_3$=tri-para-methylphenylphosphite.

EXAMPLE 5

11 g. of 1,3,7-octatriene, 6 g. of butadiene and 3 g. of acetic acid were reacted at 130° C. for 5 hours in the presence of 22 mg. of palladium acetate, 3.7 g. of tributylamine and 51 mg. phthalonitrile as catalyst. According to the analysis of the resulting products, conversion of acetic acid was 64% and the resulting products were 3.20 g. of 1-acetoxy-2,7-octadiene, 0.28 g. of 3-acetoxy-1,7-octadiene and 3-acetoxy-1,6-octadiene, 1.80 g. of 1-acetoxy-2,7,11-dodecatriene and 0.73 g. of 3-acetoxy-1,7,11-dodecatriene.

EXAMPLE 6

11 g. of 1,3,7-octatriene, 8 g. of butadiene, and 3 g. of acetic acid were reacted at 110° C. for 5 hours in the presence of the catalyst of the palladium compound and

EXAMPLE 9

11 g. of 1,3,7-octatriene, 9.7 g. of 1,3-butadiene and 3 g. of acetic acid were reacted at 110° C. for 5 hours in the presence of 0.1 mmole of tetrakis (triphenylphosphine) palladium and 0.1 mmole of diisopropylamine as catalyst.

According to the analysis, the conversion of acetic acid was 34% and the resulting products were 1.34 g. of 1-acetoxy-2,7-octadiene, 0.29 g. of 3-acetoxy-1,7-octadiene and 3-acetoxy-1,6-octadiene, 1.07 g. of 1-acetoxy-2,7,11-dodecatriene and 0.51 g. of 3-acetoxy-1,7,11-dodecatriene.

EXAMPLE 10

11 g. of 1,3,7-octatriene, 8.6 g. of 1,3-butadiene, and 3 g. of acetic acid were reacted at 110° C. for 5 hours in the presence of 0.1 mmole of palladium propionate and 0.1 mmole of diisopropylamine as catalyst.

According to the analysis, the conversion of acetic acid was 67% and the resulting products were 1.58 g. of 1-acetoxy-2,7-octadiene, 0.55 g. of 3-acetoxy-1,7-octadiene and 3-acetoxy-1,6-octadiene and 3.16 g. of 1-acetoxy-2,7,11-dodecatriene, and 1.42 g. of 3-acetoxy-1,7,11-dodecatriene.

EXAMPLE 11

11 g. of 1,3,7-octatriene, 9.7 g. of 1,3-butadiene, and 3 g. of acetic acid were reacted at 110° C. for 5 hours in the presence of the catalyst system of 0.1 mmole of palladium acetylacetonate and 0.1 mmole of diisopropylamine as catalyst.

According to the analysis, the conversion of acetic acid was 77% and the resulting products were 1.75 g. of 1-acetoxy-2,7-octadiene, 0.59 g. of 3-acetoxy-1,7-octadiene and 3-acetoxy-1,6-octadiene, 3.75 g. of 1-acetoxy-2,7,11-dodecatriene and 1.69 g. of 3-acetoxy-1,7,11-dodecatriene.

EXAMPLE 12

10 g. of 2,7-dimethyl-1,3,7-octadiene, 8.1 g. of 1,3-butadiene and 3 g. of acetic acid were reacted at 110° C. for 5 hours in the presence of 0.2 mmole of palladium acetate and 0.2 mmole of diisopropylamine as a catalyst system.

According to the analysis, the conversion of acetic acid was 52%, the resulting products were 1.58 g. of 1-acetoxy-2,7-octadiene (1-AOD), 0.68 g. of 3-acetoxy-1,7-octadiene (3-AOD), and 3-acetoxy-1,6-octadiene (3'-AOD), 2.42 g. of 1-acetoxy-6,11-dimethyl-2,7,11-dodecatriene (1-ADT) and 0.98 g. of 3-acetoxy-6,11-dimethyl-1,7,11-dodecatriene (3-ADT). Accordingly, the D rate was 53%, and the $n$ rate of ADT was 71%.

EXAMPLE 13

0.1 mole of 1,3,7-octatriene, 0.15 mole of 1,3-butadiene and 0.05 mole of propionic acid were reacted at 110° C. for 5 hours in the presence of 0.1 mmole of palladium acetate and 0.1 mmole of diisopropylamine as catalyst.

According to the analysis, the conversion of propionic acid was 41%, and the resulting products were 1.03 g. of 1-propionyloxy-2,7-octadiene (1-AOD), 0.46 g. of 3-propionyloxy-1,7-octadiene (3-AOD) and 3-propionyloxy-1,6-octadiene (3'-AOD), 2.18 g. of 1-propionyloxy-2,7,11-dodecatriene (1-ADT), and 0.73 g. of 3-propionyloxy-1,7,11-dodecatriene (3-ADT). Accordingly, the D rate was 60% and the $n$ rate of ADT was 75%.

EXAMPLE 14

0.1 mole of 1,3,7-octatriene, 0.15 mole of 1,3-butadiene and 0.05 mole of benzoic acid were reacted at 110° C. for 5 hours in the presence of 0.1 mmole of palladium acetate and 0.1 mmole of diisopropylamine, as catalyst.

According to the analysis, conversion of benzoic acid was 32%, and the resulting products were 1.29 g. of 1-benzoyloxy-2,7-octadiene (1-AOD), 0.51 g. of 3-benzoyloxy-1,7-octadiene (3-AOD) and 3-benzoyloxy-1,6-octadiene (3'-AOD), 1.77 g. of 1-benzoyloxy-2,7,11-dodecatriene (1-ADT) and 0.56 g. of 3-benzoyloxy-1,7,11-dodecatriene (3-ADT). Accordingly, the D rate was 61% and the $n$ rate of ADT was 76%.

Having now fully described the invention, it will be apparent to one of ordinary skill in the art that many changes and modifications can be made thereto without departing from the spirit or scope of the invention.

Accordingly, what is claimed as new and desired to be secured by Letters Patent is:

1. A process for producing an acyloxydodecatriene which consists essentially of admixing and reacting 1,3,7-octatriene or a lower alkyl substituted 1,3,7-octatriene having the general formula:

wherein each $R_1$ may be the same or different and may be selected from the group consisting of hydrogen and a lower alkyl group; butadiene; and a carboxylic acid having 2-20 carbon atoms and having the general formula:

wherein $R_2$ is an alkyl group, a cycloalkyl group, an aryl group or an aralkyl group, in the presence of a catalytic amount of a catalyst consisting essentially of the combination of palladium or a palladium compound wherein the palladium compound is palladium carboxylate chelate complexes of palladium or $\pi$-allyl type complexes of palladium, optionally a phosphine, phosphite, nitrile or isonitrile and an amine wherein said amine is selected from the group consisting of aliphatic amines, aromatic amines, heterocyclic amines and anion exchange resins having a tertiary amine wherein the molar ratio of the octatriene: butadiene:carboxylic acid is 1.0:1–10:0.1–2.0.

2. The process of claim 1, wherein said reaction is effected at a temperature of from 10–200° C. and a pressure of 1–50 atmospheres.

3. The process of claim 1, wherein 0.0001–0.1 gram atom of palladium component per 1 mole of octatriene and 1–100 mole of amine per 1 gram atom of palladium component are used as the catalyst.

4. The process of claim 1, pherein said amines are selected from the group consisting of methylamine, dimethylamine, trimethylamine, ethylamine, diethylamine, triethylamine, propylamine, dipropylamine, tripropylamine, isopropylamine, diisopropylamine, butylamine, dibutylamine, t-butylamine, octylamine, dioctylamine, trioctylamine, morphorine, pyrrolidine, piperidine, ethanolamine, diethanolamine, ethylenediamine, diethylenetriamine, aniline, toluidine, pyridine, quinoline and anion exchange resins having a tertiary amine.

5. The process of claim 1, wherein 1-acyloxydodecatriene or 3-acyloxydodecatriene is added to the reaction mixture to cause the preferential formation of the opposite isomer.

6. The process of claim 1, wherein 1,3,7-octatriene, butadiene and a carboxylic acid having 2-20 carbon atoms are reacted at 10–200° C. in the presence of a catalytic amount of the combination of palladium salt of an organic acid containing 2-20 carbon atoms, and an aliphatic amine containing 1-30 carbon atoms or a saturated heterocyclic amine containing 1-30 carbon atoms, and thereafter recovering 1-acyloxydodecatriene and 3-acyloxydodecatriene.

7. The process of claim 1, wherein said 1,3,7-octatriene, butadiene and carboxylic acid are reacted at 10–200° C. in the presence of a chelate complex of palladium and an aliphatic amine having 1-30 carbon atoms, or a saturated heterocyclic amine having 1-30 carbon atoms, and 1-acyloxydodecatriene and 3-acyloxydodecatriene are recovered.

8. The process of claim 1, wherein 1,3,7-octatriene, butadiene and acetic acid are reacted at 10–200° C. in the presence of the palladium compound and the amine.

(References on following page)

References Cited

UNITED STATES PATENTS

| | | | |
|---|---|---|---|
| 3,088,985 | 5/1963 | Wilke | 260—677 R |
| 3,534,088 | 10/1970 | Bryant et al. | 260—497 A |
| 3,541,177 | 11/1970 | Hagihara et al. | 260—677 R |
| 3,673,270 | 6/1972 | Gosser | 260—677 R X |
| 3,691,249 | 9/1972 | Young | 260—677 R |

LORRAINE A. WEINBERGER, Primary Examiner

R. D. KELLY, Assistant Examiner

U.S. Cl. X.R.

260—468 R, 476 R, 484 R